US006415815B1

United States Patent
Blann et al.

(10) Patent No.: US 6,415,815 B1
(45) Date of Patent: Jul. 9, 2002

(54) PRESSURE RELIEF VALVE

(76) Inventors: Brian David Francis Blann, 2430 Palmerston Avenue, West Vancouver, British Columbia (CA), V7V 2W3; Kari Juhani Oksanen, 705 West 6th Avenue, Vancouver, British Columbia (CA), V6P 2L2

( * ) Notice: Subject to any disclaimer, the term of this patent is extended or adjusted under 35 U.S.C. 154(b) by 0 days.

(21) Appl. No.: 09/704,194

(22) Filed: Oct. 31, 2000

(51) Int. Cl.[7] .............................................. F16K 17/04
(52) U.S. Cl. ....................................... 137/494; 137/495
(58) Field of Search ................................ 137/494, 495, 137/489, 488, 492, 492.5, 484.2

(56) References Cited

U.S. PATENT DOCUMENTS

| | | |
|---|---|---|
| 740,704 A | 10/1903 | Singer |
| 1,504,620 A | 8/1924 | Good |
| 1,744,290 A | 1/1930 | Weber |
| 2,158,068 A | 5/1939 | Grove |
| 2,472,070 A | 6/1949 | Garretson |
| 2,579,334 A | 12/1951 | Plank |
| 2,580,433 A | 1/1952 | Kain |
| 2,956,583 A | 10/1960 | Streeter |
| 5,080,129 A * | 1/1992 | Machat ........................ 137/489 |
| 5,163,471 A * | 11/1992 | Powell ........................ 137/494 |
| 5,348,036 A * | 9/1994 | Oksanen et al. ......... 137/489 X |
| 5,845,675 A * | 12/1998 | Ligh ........................... 137/489 |
| 5,967,176 A | 10/1999 | Blann et al. |

OTHER PUBLICATIONS

Brochure—"Pilot Valves Model 81–RP & 81–RPD"—Singer Valve Inc., Nov. 1998.

* cited by examiner

Primary Examiner—Kevin Lee
(74) Attorney, Agent, or Firm—Knobbe, Martens, Olson & Bear, LLP

(57) ABSTRACT

A pressure relief valve for relieving excess pressure in a fluid distribution system comprising a valve body having an inlet port and an outlet port in communication with an interior of the valve body. The inlet port is connectable to the fluid distribution system. A valve member within the interior of the valve body is movable between a closed position to prevent fluid flow through the body and an open position to permit fluid flow. The valve member is exposed to a first opening force exerted directly by the pressure in the fluid distribution system. There is a movable piston/diaphragm member co-operating with the valve member such that the piston/diaphragm is exposed to the pressure in the fluid distribution system to provide a second opening force for the valve member. A biasing system exerts a default closing force to move the valve member to the closed position. The closing force is set to be equivalent to a pre-selected pressure in the fluid distribution system. The opening forces of the system pressure on the valve member are supplemented by the opening forces of the system pressure acting on the movable member to readily move the valve member to the open position whenever the pressure in the fluid distribution system exceeds the pre-selected pressure.

18 Claims, 4 Drawing Sheets

PRESSURE RELIEF VALVE

FIELD OF THE INVENTION

This invention relates to a pressure relief valve which is particularly suited for use in a fluid distribution system to reduce overpressure.

BACKGROUND OF THE INVENTION

Current practice in the field of fluid distribution systems is to rely on direct acting or pilot operated pressure relief valves to avoid excess pressure developing within the system to avoid exposing attached components to damaging overpressures. Relief valves are normally connected to a "Tee" in the system so that they discharge fluid to waste or a lower pressure zone when the system pressure exceeds the set point pressure.

Direct acting relief valves rely on a valve member that is exposed to an opening force created by the pressure of the fluid distribution system and a closing force created by a spring. If the pressure of the distribution system (the opening force) exceeds the closing force established by the spring, the valve will open to release fluid and relieve pressure until the spring force is sufficient to close the valve. Sometimes a dashpot is used to reduce fast closing or slamming of the valve.

Direct acting relief valves offer the advantages of opening virtually instantly and being useable in both clean and dirty water distribution systems. At the same time, such valves suffer from the disadvantage that very large overpressures are required to open the valve any significant amount. Once the seat area of the valve exceeds a few square inches, the forces necessary to open the valve must significantly exceed normal system pressure particularly when the valve is open. In general, very long springs are required with respect to the stroke of the valve so that the opening force necessary to move the valve does not increase greatly as the valve opens and the springs are compressed or extended. The opening force of the fluid acting against the moveable inner valve decreases significantly as the valve opens with the result that the pressure creating the opening force trends to the pressure in the portion of the valve immediately downstream of the seat.

These factors require that there be a substantial increase in system pressure before the direct acting valve opens beyond 10% of its stroke. A severe overpressure surge requiring discharge corresponding to greater than 50% opening of the valve results in high system overpressure before the relief valve permits sufficient flow to waste to limit further pressure increase. In view of the above design considerations, direct acting relief valves larger than approximately 2 inches in seat diameter tend to be large, clumsy and expensive with bulky housings and long springs As an alternative, pilot operated relief valves can be used to relieve overpressures in a fluid distribution system. Pilot operated valves employ a small direct acting valve to control a larger diaphragm or piston operated main relief valve. The pilot operated valves require needle valves, strainers or filters in the pilot circuit. This characteristic makes them suitable for clean water applications, but inappropriate for systems handling sewage or dirty water in which particulate material can clog the pilot circuit.

Pilot operated relief valves also suffer from the disadvantage that they are relatively slow to react to overpressures. Because pilot opera ted valves have to release fluid from a control chamber through tubing and the pilot valve itself, several seconds may be required for the valve to open fully. Booster valves may be used to speed opening, but the time delay may still be overly long to suit the operating specifications of the fluid distribution system.

SUMMARY OF THE INVENTION

To address the foregoing problems in prior art relief valve designs, we have developed a new pressure relief valve that offers the quick response time and clean/dirty water functioning of direct acting valves and the large fluid flow capabilities of pilot operated relief valves.

Accordingly, the present invention provides a pressure relief valve for relieving excess pressure in a fluid distribution system comprising:

a valve body having an inlet port and an outlet port in communication with an interior of the valve body, the inlet port being directly connectable to the fluid distribution system;

a valve member movable between a closed position to prevent fluid flow through the valve body and an open position to permit fluid flow through the valve body, the valve member being exposed to a first opening force exerted by the pressure in the fluid distribution system;

a movable member co-operating with the valve member such that the movable member is exposed to the pressure in the fluid distribution system to provide a second opening force for the valve member; and biasing apparatus to exert a default closing force to move the valve member to the closed position, the closing force being equivalent to a pre-selected pressure in the fluid distribution system;

whereby the first and second opening forces act to move the valve member to the open position whenever the pressure in the fluid distribution system exceeds th e pre-selected pressure.

The valve unit of the present invention provides quick detection and opening of the valve member to relieve overpressures in the fluid distribution system.

The pressure relief valve finds application in both clean and dirty fluid applications. When used in a dirty water environment, an additional interface chamber is used to transmit the pressure of the fluid distribution system via a movable seal interface and an inert fluid to the movable member to exert the supplementary opening force.

Preferably, the area of the movable member is significantly larger than that of the valve member so that any system overpressure is applied to a combined area that is much larger than the relatively small area of the valve member to generate a larger opening force. This multiplication of the opening force allows the valve of the present invention to open fully with only a small increase in system pressure. The auxiliary chamber is isolated from the main fluid flow through the valve interior so the opening forces generated by the movable member tend to be unaffected by the pressure reduction that results as the fluid flows past the valve member.

BRIEF DESCRIPTION OF THE DRAWINGS

Aspects of th e present invention are illustrated, merely by way of example, in the accompanying drawings in which.

DESCRIPTION OF THE PREFERRED EMBODIMENTS

Figure 1:
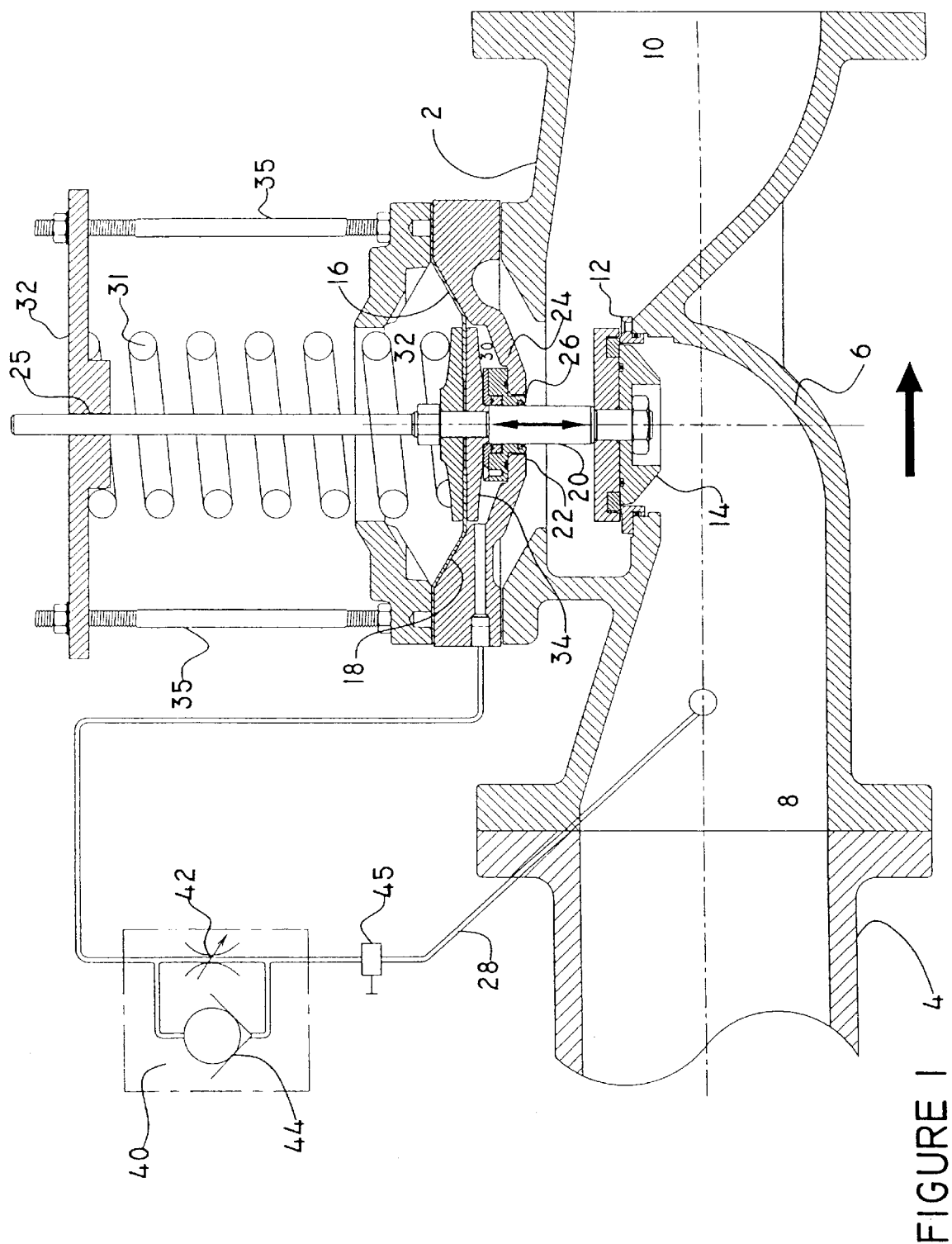
FIG. 1 is a section view through a first embodiment of the pressure relief valve of the present invention that relies on a spring to generate the closing forces and a resilient diaphragm to generate some of the opening forces for the valve.

Referring to FIG. 1, there is shown a first embodiment of a pressure relief valve 2 according to the present invention. The valve 2 is fitted to a fluid distribution system 4 and functions to relieve excess pressure in system 4.

Pressure relief valve 2 includes a valve body 6 having an inlet port 8 in direct communication with fluid distribution system 4 and an outlet port 10 that directs fluid out of the fluid distribution system to a waste or lower pressure zone. Inlet port 8 and outlet port 10 also communicate with the interior of valve body 6.

Valve body 6 is formed with valve seat 12 intermediate the inlet and outlet ports. Valve member 14 is movable between a closed position engaging seat 12 to prevent fluid flow through the valve body and an open position to permit fluid flow. FIG. 1 shows valve member 14 in the closed position. In this position, valve member 14 is exposed to a first opening force exerted by the pressure in the fluid distribution system acting against the exposed surface area of the valve member within seat 12.

The pressure relief valve of the present invention further comprises a movable member that co-operates with valve member 14 to assist in moving the valve member away from the closed position. In the illustrated embodiment of FIG. 1, the movable member comprises a resilient diaphragm 16 that is housed in an auxiliary chamber 18 above valve member 6. Diaphragm 16 is rigidly connected to valve member 14 via a stem 20 that extends through sealed passage 22 in the floor 24 of auxiliary chamber 18. Diaphragm 16 is sandwiched between a pair of opposed disk plates 34 that provide a mounting location to connect stem 20 to the diaphragm. Movement of valve member 14 is transmitted by slidable movement of stem 20 in passage 22 to cause simultaneous movement of diaphragm 16 and vice versa. Upper and lower valve stem guides 25 and 26 mount the stem 20 for slidable movement to permit valve member 14 to be moved into and out of engagement with valve seat 12.

Diaphragm 16 in auxiliary chamber 18 is exposed to the pressure in the fluid distribution system in order to provide a second opening force to valve member 14. As illustrated schematically in FIG. 1, there is a conduit 28 from extending from inlet port 8 communicating the fluid of the fluid distribution system to auxiliary chamber 18. Diaphragm 16 extends across chamber to divide the chamber into a first region 30 below diaphragm 16 and a second region 32 above the diaphragm. Second region 32 is at atmospheric pressure. Conduit 28 communicates with first region 30 to deliver fluid from the fluid distribution system to the auxiliary chamber below diaphragm 16. The pressure of the fluid in first region 30 of auxiliary chamber 18 acts against diaphragm 16 to generate a second opening force tending to move valve member 14 from the closed position at seat 12. Diaphragm 16 preferably has a larger surface area exposed to the pressure of the fluid distribution system than valve member 14 so that the second opening force is larger than the first opening force.

The first and second opening forces generated at valve member 14 and diaphragm 16, respectively, work in opposition to a default closing force generated by biasing apparatus that acts to move valve member 14 to the closed position. In the illustrated embodiment, the biasing apparatus comprises a coil spring 30 extending between an upper stop 32 and diaphragm 16. Disk plates 34 provide a bearing surface to support the lower end of spring 30. The closing force exerted by spring 30 is adjustable by movement of stop 32 on parallel posts 35 extended from the valve body. The closing force is set to be equivalent to a pre-selected pressure in the fluid distribution system equal to the maximum desired pressure in the system. Any pressure in the fluid distribution system above the pre-selected pressure will result in the pressure relief valve opening to relieve the overpressure by discharge of fluid through outlet port 10.

The pressure relief valve of the present invention is designed such that the pressure of the fluid distribution system is applied both to the underside of valve member 14 and to the underside of diaphragm 16 in auxiliary chamber 18. When there is a system overpressure or pressure surge, the excess pressure is applied to the valve member and the diaphragm. As the diaphragm has a greater exposed surface area than valve member 14, the opening forces on the valve member are only a small portion of the overall opening forces. The pressure under diaphragm 16 is always the system pressure of the fluid distribution system. The result is that valve member 14 opens promptly for any given pressure increase above the pre-selected pressure and opens more widely for any given pressure increase than a conventional direct acting valve. This allows more fluid to be released through outlet port 10 for a given pressure increase reducing the peak pressure in the system.

Preferably, conduit 28 connecting inlet port 8 to first region 30 of auxiliary chamber 18 is a large diameter tube to permit free movement of fluid for virtually instantaneous transmittal of pressure fluctuations to diaphragm 16. Conduit 28 also preferably includes a flow control device 40 comprising a needle valve 42 and a check valve 44 connected in parallel to allow unrestricted flow of fluid through the conduit into the first region of the auxiliary chamber below the diaphragm while limiting the flow of fluid in the opposite direction. This arrangement allows for adjustment of the closing time of valve member 14 by adjusting the opening of needle valve 42. Increasing the closing time of the valve member prevents "water hammer". A shut-off valve 45 in conduit 28 is also preferable to permit isolation of auxiliary chamber 18 for maintenance work.

Figure 2:
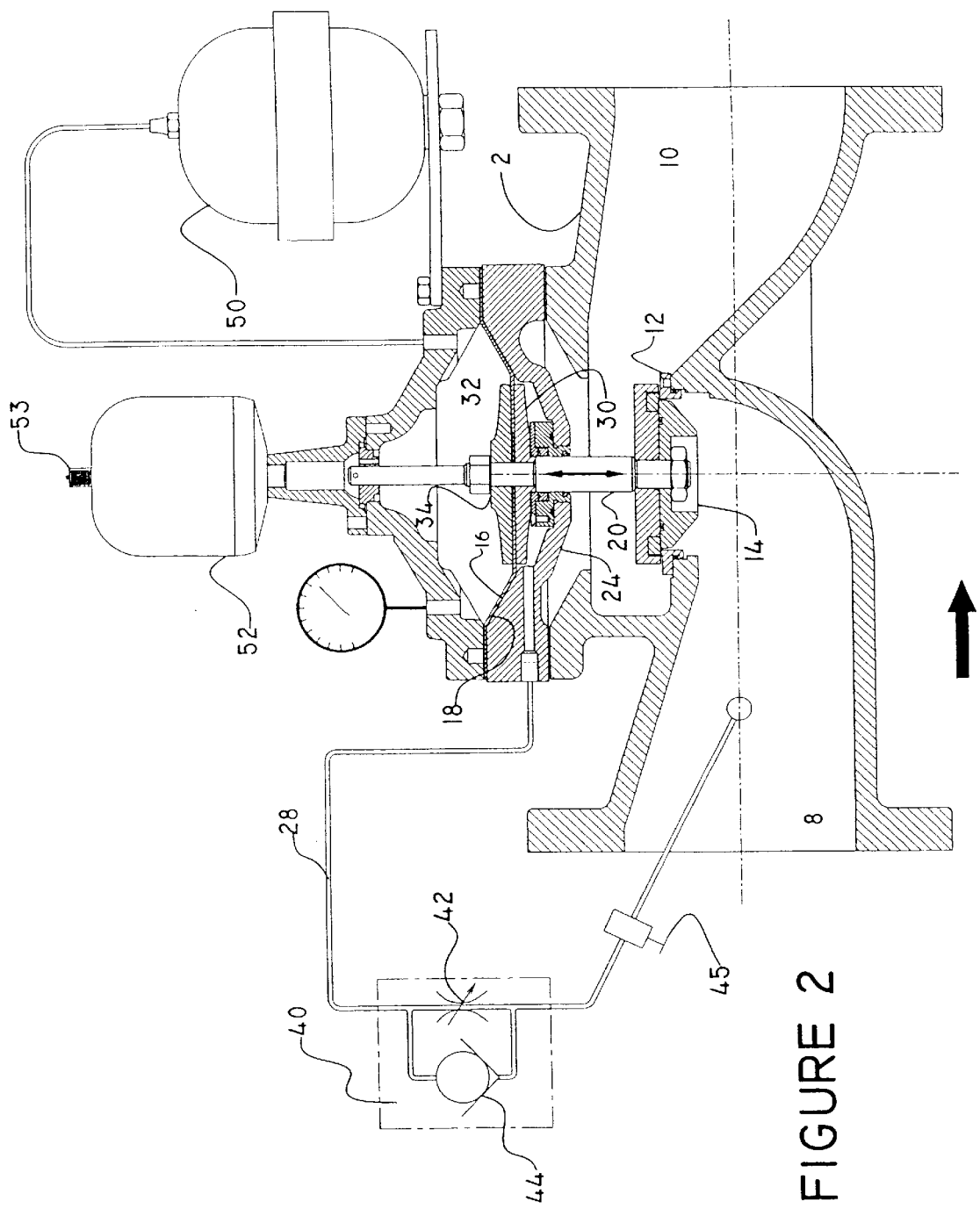
FIG. 2 is a section view of a second embodiment of the valve of the present invention that relies on gas pressure to generate closing forces.

FIG. 2 illustrates a second embodiment of the pressure relief valve of the present invention. Parts that are identical to parts in the first embodiment are labelled with the same reference numbers. The second embodiment is identical to the first in structure and operation except a different biasing apparatus to generate a closing force for valve member 14 is provided. Instead of a coiled spring, the second region 32 of auxiliary chamber 18 is sealed and in communication with a pressure source 50 to maintain the second region at a pressure at least equal to the pre-selected pressure for opening of the valve. The volume of the second region 32 is pre-charged with gas to generate sufficient pressure forces to equal the pre-selected system pressure that triggers opening of the valve. Preferably, pressure source 50 comprises a source of compressed gas such as air or nitrogen. To reduce the rate of change of the closing force when valve member 14 opens (i.e. the resistance to valve member 14 opening), second region 32 preferably includes an additional vessel 52 communicating with the second region to increase the total volume of the region such that the pressure generating the closing force is maintained essentially constant (P*V= constant). Preferably, an inlet valve 53 is provided, for example, at additional vessel 52, to permit pressurization of second region 32 by an alternative pressure source such as an air pump.

Figure 3:
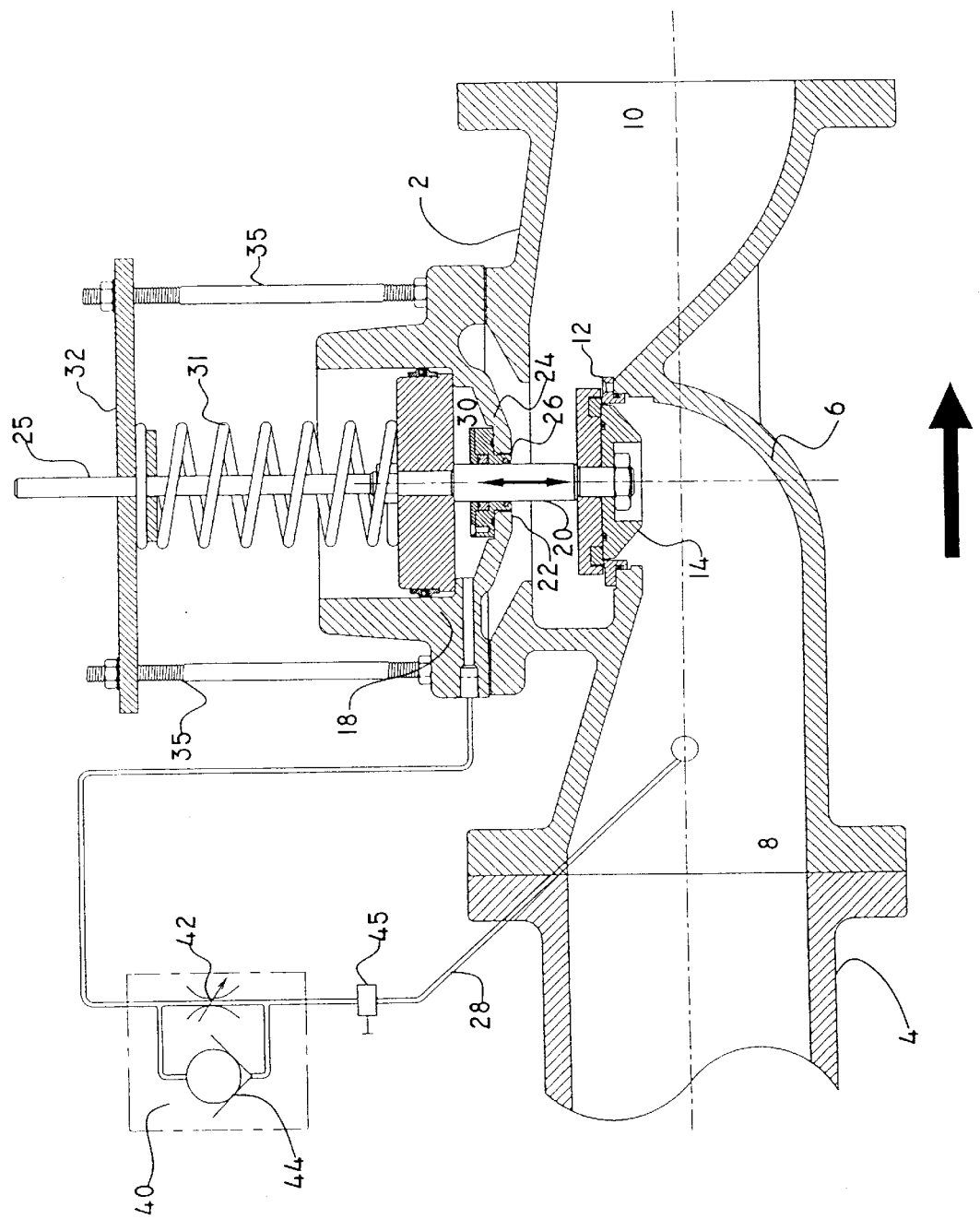
FIG. 3 is a section view of a third embodiment that uses a piston as the sealed movable member instead of a resilient diaphragm.

FIG. 3 illustrates a third embodiment of the pressure relief valve of the present invention. Parts that are identical to parts in the first and second embodiment are labelled with the same reference numbers. In the third embodiment of FIG. 3, resilient diaphragm 16 is replaced by a piston 60 moving within a cylindrical auxiliary chamber 18. Piston 60 divides the cylindrical auxiliary chamber into a first region 30 below the piston and a second region 32 above the piston. In the illustrated embodiment, a coil spring 30 in second region 32 biases the piston and valve member 14 to the closed position. A person skilled in the art will readily appreciate that piston 60 can also be biased by gas pressure in a sealed second region 32 communicating with a pressure source as disclosed in the second embodiment of FIG. 2.

The diaphragm/spring valve arrangement of the first embodiment of FIG. 1 is generally limited to low pressure fluid distribution system by the strength of the diaphragm which is unsupported. The piston/spring arrangement of FIG. 3 is useful in higher pressure environments. The valve designs of the present invention which rely on a sealed second region 32 and a pressure source 50 to generate a closing force acting on a piston or diaphragm are suited to high pressure environments as this arrangement minimizes the pressure difference across the piston or diaphragm.

The foregoing pressure relief valves are best suited to clean fluid environments. The relatively small size of the flow control devices 40 of conduit 28 are subject to plugging unless clean fluids are used.

Figure 4:
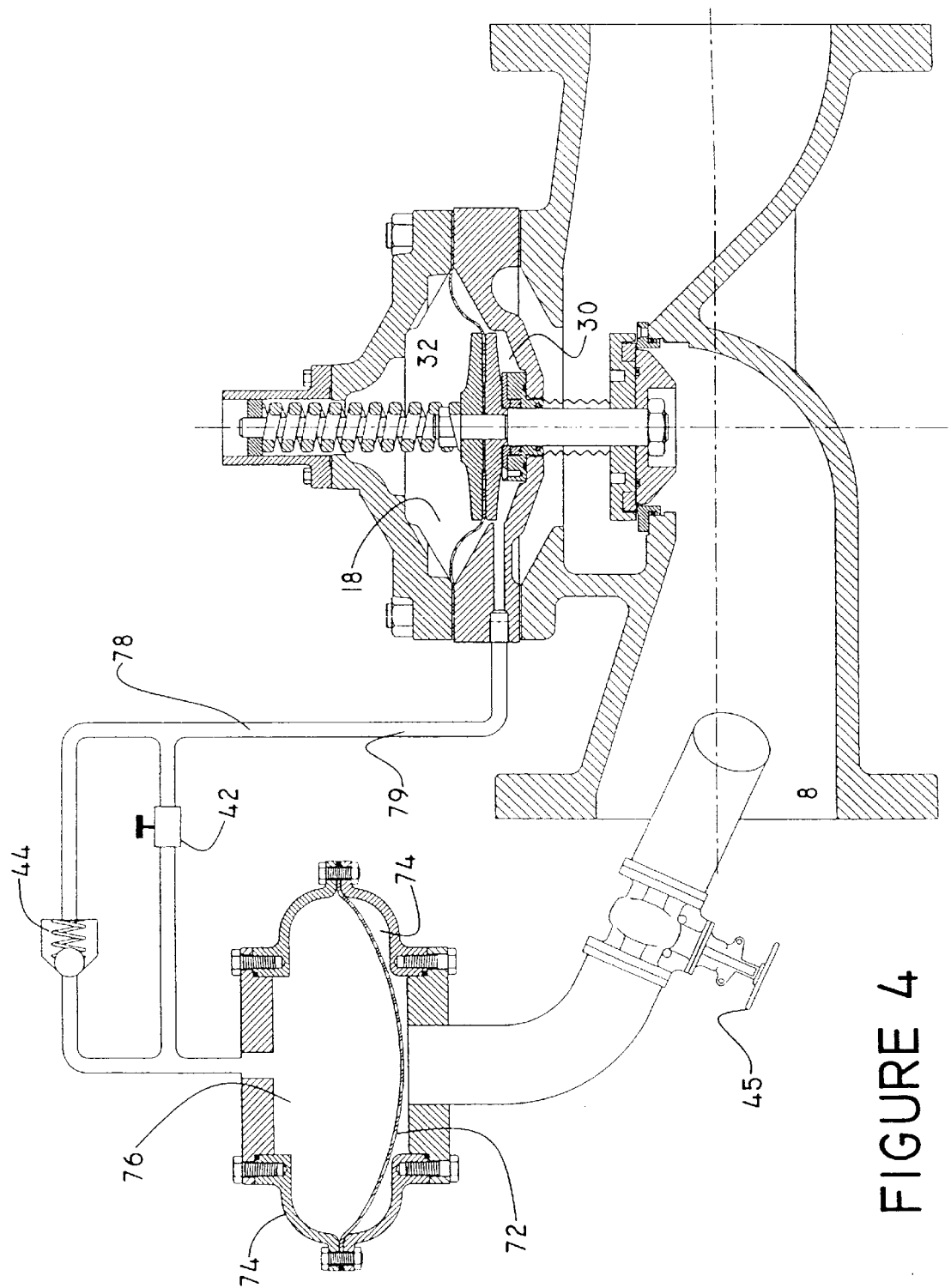
FIG. 4 is a section view of a fourth embodiment, suited for dirty water applications, that includes an interface chamber for transmitting the pressure of the dirty system fluid to the movable member via a movable surface and an inert fluid.

FIG. 4 illustrates a fourth embodiment of the present invention incorporating an interface chamber 70 which renders the pressure relief valve of the present invention suitable for use in dirty water environments or environments in which the fluid being handled is potentially damaging to the piston/diaphragm members (corrosive fluids). The pressure relief valve of FIG. 4 operates in exactly the same manner as in previous embodiments, however, instead of the fluid of the fluid distribution system being delivered directly to the first region 30 of auxiliary chamber 18, the system fluid is delivered by conduit 28 only as far as interface chamber 70. Conduit 28 is preferably of relatively large diameter, for example, 1.5 to 2 inches, to prevent plugging by particulate material in the dirty system fluid. Interface chamber 70 includes a movable interface 72 that divides the chamber into first and second sealed regions 74 and 76 on opposite sides of the interface. Interface 72 is preferably a resilient diaphragm. Conduit 28 extends from inlet port 8 of the valve body to communicate the fluid of the fluid distribution system to the first region 74. A second conduit 78 communicates second region 76 with first region 30 of auxiliary chamber 18. A second fluid 79 sealed from the system fluid by movable interface 72 fills second region 76 of the interface chamber, the second conduit 78 and the variable volume of first region 30 of auxiliary chamber 18. Movable interface 72 acts to transmit the pressure of the fluid distribution system to the second fluid to generate the second opening force at diaphragm 16. Since second fluid 79 is kept separate from the system fluid, it can be selected for the most suitable characteristics such as viscosity, temperature tolerance, lubrication and inertness. The second fluid is preferably a non-compressible, inert fluid such as mineral oil or the like. The swept volume capacity of movable interface 72 exceeds the swept volume capacity of auxiliary chamber diaphragm 16.

Flow control devices in the form of check valve 44 and restriction valve 42 are preferably arranged in parallel in second conduit 78 to allow unrestricted flow of clean second fluid 79 through the second conduit into first region 30 of auxiliary chamber 18 and to limit the flow of fluid in the opposite direction. Second fluid 79 does not mix with the dirty fluid of the fluid distribution system so there is no risk of clogging of the check or restriction valves.

When there is an overpressure condition in the fluid distribution system, conduit 28 transmits the overpressure to movable interface 72. Movement of interface 72 causes second fluid 79 to quickly flow into region 30 of auxiliary chamber 18 creating an opening force to lift valve member 14 from seat 12. On return to normal system pressure, spring 31 forces second fluid 79 back to region 76 of interface chamber 70 at a rate controlled by needle valve 42 to prevent too rapid closing of the valve member 14.

FIG. 4 illustrates the interface chamber 70 in use with a pressure relief valve that uses a spring/diaphragm arrangement in auxiliary chamber 18. It will be apparent to a person skilled in the art that interface chamber 70 can also be used in a spring/piston or pressure chamber/piston or pressure chamber/diaphragm arrangement to convert the pressure relief valve into a unit suitable for use with a dirty fluid distribution system.

Although the present invention has been described in some detail by way of example for purposes of clarity and understanding, it will be apparent that certain changes and modifications may be practised within the scope of the appended claims.

We claim:

1. A pressure relief valve for relieving excess pressure in a fluid distribution system comprising:

a valve body having an inlet port and an outlet port in communication with an interior of the valve body, the inlet port being connectable directly to the fluid distribution system;

a valve member movable between a closed position to prevent fluid flow through the valve body and an open position to permit fluid flow through the valve body, the valve member being exposed to a first opening force exerted by the pressure in the fluid distribution system;

an auxiliary chamber in the valve body isolated from the interior of the valve body;

a movable member housed in the auxiliary chamber to divide the chamber into first and second regions and exposed to the pressure in the fluid distribution system, the movable member co-operating with the valve member to provide a second opening force for the valve member;

an interface chamber having first and second sealed regions on opposite sides of a movable interface, a first conduit from the inlet port of the valve communicating the fluid of the fluid distribution system to the first interface chamber region, a second conduit communicating the second interface chamber region with the first region of the auxiliary chamber, and a second fluid in the second interface chamber region such that the pressure of the fluid in the fluid distribution system is transmitted via the movable interface to the second fluid to generate the second opening force at the movable member; and biasing apparatus to exert a default closing force to move the valve member to the closed position, the closing force being equivalent to a pre-selected pressure in the fluid distribution system whereby the first and second opening forces act to move the valve member to the open position whenever the pressure in the fluid distribution system exceeds the pre-selected pressure.

2. A pressure relief valve as claimed in claim 1 in which the movable member has a larger area exposed to the pressure of the fluid distribution system than the valve member such that the second opening force is larger than the first opening force.

3. A pressure relief valve as claimed in claim 1 in which the movable member is a resilient diaphragm extending across the auxiliary chamber to divide the auxiliary chamber into the first and second regions.

4. A pressure relief valve as claimed in claim 1 in which the auxiliary chamber is a cylinder and the movable member is a piston slidable within the cylinder to divide the chamber into the first and second regions.

5. A pressure relief valve as claimed in claim 1 in which the movable member is rigidly connected to the valve member to permit simultaneously movement of the members.

6. A pressure relief valve as claimed in claim 1 including a shaft interconnecting the movable member in the auxiliary chamber and the valve member in the valve body for simultaneous movement, the auxiliary chamber including a sealed passage therethrough to accommodate slidable movement of the shaft.

7. A pressure relief valve as claimed in claim 1 including a flow control device in the second conduit to limit the flow of second fluid through the second conduit.

8. A pressure relief valve as claimed in claim 7 in which the flow control device comprises a needle valve and a check valve connected in parallel to allow unrestricted flow of the second fluid through the second conduit into the first region of the auxiliary chamber and to limit the flow of fluid in the opposite direction.

9. A pressure relief valve as claimed in claim 1 in which the second fluid is an inert fluid.

10. A pressure relief valve as claimed in claim 9 in which the second fluid is mineral oil.

11. A pressure relief valve as claimed in claim 1 in which the biasing apparatus comprises a spring in the second region acting on the movable member.

12. A pressure relief valve as claimed in claim 11 in which the movable member is a resilient diaphragm extending across the auxiliary chamber and includes a rigid surface extending over a portion of the resilient diaphragm to support an end of the spring.

13. A pressure relief valve as claimed in claim 1 in which the second region of the auxiliary chamber is sealed, and the biasing apparatus comprises a pressure source communicating with the second region of the auxiliary chamber to maintain said second region at a pressure at least equal to the pre-selected pressure.

14. A pressure relief valve as claimed in claim 13 in which the pressure source is a source of compressed gas.

15. A pressure relief valve as claimed in claim 13 including an additional vessel in communication with the second region of the auxiliary chamber to increase the total volume of said second region.

16. A pressure relief valve for relieving excess pressure in a fluid distribution system comprising:

a valve body having an inlet port and an outlet port in communication with an interior of the valve body, the inlet port being connectable directly to the fluid distribution system;

a valve member movable between a closed position to prevent fluid flow through the valve body and an open position to permit fluid flow through the valve body, the valve member being exposed to a first opening force exerted by the pressure in the fluid distribution system;

a cylindrical auxiliary chamber in the valve body isolated from the interior of the valve body;

a movable piston member slidable within the auxiliary chamber to divide the chamber into first and second regions and exposed to the pressure in the fluid distribution system, the movable piston member co-operating with the valve member to provide a second opening force for the valve member; and biasing apparatus to exert a default closing force to move the valve member to the closed position, the closing force being equivalent to a pre-selected pressure in the fluid distribution system whereby the first and second opening forces act to move the valve member to the open position whenever the pressure in the fluid distribution system exceeds the pre-selected pressure.

17. A pressure relief valve for relieving excess pressure in a fluid distribution system comprising:

a valve body having an inlet port and an outlet port in communication with an interior of the valve body, the inlet port being connectable directly to the fluid distribution system;

a valve member movable between a closed position to prevent fluid flow through the valve body and an open position to permit fluid flow through the valve body, the valve member being exposed to a first opening force exerted by the pressure in the fluid distribution system;

an auxiliary chamber in the valve body isolated from the interior of the valve body;

a movable member housed in the auxiliary chamber to divide the chamber into first and second regions and exposed to the pressure in the fluid distribution system, the movable member co-operating with the valve member;

a conduit from the inlet port of the valve communicating the fluid of the fluid distribution systems to the first region of the auxiliary chamber to generate the second opening force at the movable member;

a needle valve and a check valve connected in parallel in the conduit to allow unrestricted flow of fluid through the conduit into the first region of the auxiliary chamber and to limit the flow of fluid in the opposite direction from the first region to the inlet port; and biasing apparatus to exert a default closing move the valve member to the closed position, the closing force being equivalent to a pre-selected pressure in the fluid distribution system whereby the first and second opening forces act to move the valve member to the open position whenever the pressure in the fluid distribution system exceeds the pre-selected pressure.

18. A pressure relief valve for relieving excess pressure in a fluid distribution system comprising:

a valve body having an inlet port and an outlet port in communication with an interior of the valve body, the inlet port being connectable directly to the fluid distribution system;

a valve member movable between a closed position to prevent fluid flow through the valve body and an open position to permit fluid flow through the valve body, the valve member being exposed to a first opening force exerted by the pressure in the fluid distribution system;

an auxiliary chamber in the valve body isolated from the interior of the valve body;

a movable member housed in the auxiliary chamber to divide the chamber into first and second regions and exposed to the pressure in the fluid distribution system, the movable member co-operating with the valve member to provide a second opening force for the valve member with the second region of the auxiliary chamber being sealed; and a pressure source communicating with the second region to maintain the second region at a pressure to exert a default closing force to move the valve member to the closed position, the closing force being equivalent to a pre-selected pressure in the fluid distribution system whereby the first and second opening forces act to move the valve member to the open position whenever the pressure in the fluid distribution system exceeds the pre-selected pressure.

* * * * *